United States Patent
Billig et al.

(10) Patent No.: US 6,681,169 B2
(45) Date of Patent: Jan. 20, 2004

(54) CONTROL SYSTEM AND METHOD USING AN ELECTRONIC CONTROL UNIT FOR WHEEL-SPECIFIC BRAKING TORQUE CONTROL

(75) Inventors: Christian Billig, Munich (DE); Gerhard Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 106 days.

(21) Appl. No.: 09/966,113

(22) Filed: Oct. 1, 2001

(65) Prior Publication Data

US 2002/0040269 A1 Apr. 4, 2002

(30) Foreign Application Priority Data

Sep. 29, 2000 (DE) .......................... 100 48 251

(51) Int. Cl.[7] ............... G06F 7/00; G05D 1/00
(52) U.S. Cl. ............... 701/87; 701/70; 701/71; 303/140; 303/146; 303/147; 180/197
(58) Field of Search ............... 701/70, 87, 72, 701/71, 89, 74, 84, 90, 91, 62, 64, 69; 303/146, 147, 148, 149, 150, 151, 136, 140; 180/197, 248, 249; 477/40, 92, 94

(56) References Cited

U.S. PATENT DOCUMENTS

| | | | | |
|---|---|---|---|---|
| 5,168,950 A | * | 12/1992 | Krusche | 180/197 |
| 5,351,776 A | * | 10/1994 | Keller et al. | 701/70 |
| 5,519,617 A | * | 5/1996 | Hughes et al. | 701/84 |
| 5,839,083 A | * | 11/1998 | Sugiyama | 701/62 |
| 5,866,812 A | * | 2/1999 | Nishihara et al. | 73/146.2 |
| 6,015,020 A | * | 1/2000 | Sugiyama | 180/197 |
| 6,023,650 A | * | 2/2000 | Yamamoto et al. | 701/82 |
| 6,053,583 A | * | 4/2000 | Izumi et al. | 303/150 |
| 6,077,190 A | | 6/2000 | Tabata et al. | 477/97 |
| 6,095,945 A | * | 8/2000 | Graf | 477/97 |
| 6,115,663 A | * | 9/2000 | Yasuda | 701/89 |
| 6,226,587 B1 | * | 5/2001 | Tachihata et al. | 701/72 |

FOREIGN PATENT DOCUMENTS

| | | |
|---|---|---|
| DE | 3435869 A1 | 4/1986 |
| DE | 3713092 C1 | 12/1987 |
| DE | 19835937 A1 | 2/2000 |
| DE | 19920617 A1 | 9/2000 |
| EP | 0 180 033 | 5/1986 |
| EP | 0784551 B1 | 7/1997 |
| JP | 02080858 | 3/1990 |
| WO | WO 00/53473 | 9/2000 |

OTHER PUBLICATIONS

German Search Report and Translation of German portions thereof.

* cited by examiner

*Primary Examiner*—Jacques H. Louis-Jacques
(74) *Attorney, Agent, or Firm*—Crowell & Moring LLP

(57) ABSTRACT

A control unit of a control system for wheel-specific braking torque control is provided for a vehicle having an electronically controlled transmission. The control unit records the speeds of all wheels of the vehicle for the purpose of recognizing wheel slippage. The control unit records at least one vehicle dynamics operating parameter of the vehicle as an input signal, which can be recognized by a yawing of the vehicle. In the case of slippage on at least one wheel of an axle and when yawing of the vehicle takes place, the control unit initiates an up-shifting process in the transmission in order to reduce the engine torque by a certain torque amount. At the same time, the control unit initiates a braking intervention on both wheels of the other axle, i.e. the axle without the wheel slippage, in order to increase the braking torque by the same torque amount.

4 Claims, 2 Drawing Sheets

CONTROL SYSTEM AND METHOD USING AN ELECTRONIC CONTROL UNIT FOR WHEEL-SPECIFIC BRAKING TORQUE CONTROL

BACKGROUND AND SUMMARY OF THE INVENTION

This application claims the priority of German Application No. 100 48 251.1, filed Sep. 29, 2000, the disclosure of which is expressly incorporated by reference herein.

The invention relates to a control system with an electronic control unit for wheel-specific braking torque adjustment.

Such a control system is known, for example under the term "DSC" used on BMW vehicles in series production (see ATZ Article "Dynamische Stabilitäts Control DSC der Baureihe 7 von BMW" (Dynamic stability control DSC in the 7 Series models from BMW), 3/1999, p. 134 ff). Based on BMW's DSC control system, a vehicle dynamics control system is known, which performs wheel-specific brake intervention when unstable driving conditions occur, e.g. a yawing effect when oversteering the vehicle.

Even all-wheel drive vehicles with such vehicle dynamic control systems in the form of drive torque control systems and/or braking torque control systems are known.

The task of the invention consists of improving the control system of the above-mentioned type with regard to safety, particularly when operating the vehicle on steep descending mountain slopes with low friction coefficient ratios.

This task is solved with the features of the present invention. Beneficial developments of the invention are also described herein.

Other objects, advantages and novel features of the present invention will become apparent from the following detailed description of the invention when considered in, conjunction with the accompanying drawings.

DETAILED DESCRIPTION OF THE DRAWINGS

Figure 1:
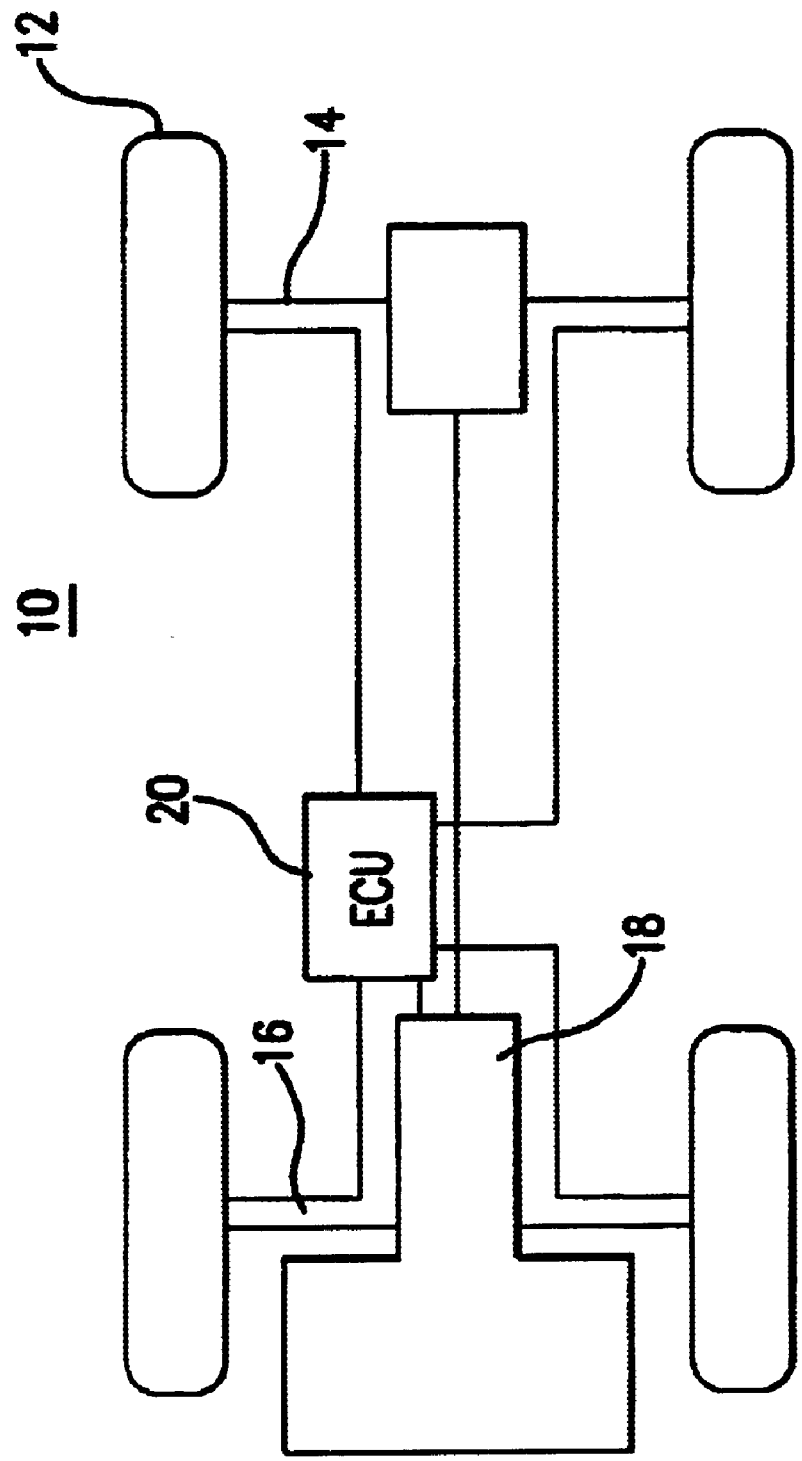
FIG. 1 is a schematic diagram of a vehicle equipped with a control system in accordance with the present invention.

Referring to FIG. 1, there is schematically shown a vehicle 10 having wheels 12 mounted on a front axle 14 and a rear axle 16. The vehicle 10 is equipped with an electronically controllable transmission 18. An electronic control unit 20 is operatively coupled with the electronically controllable transmission 18 and monitors and/or records the speeds of all wheels 12 in a known manner. The control unit 20 also monitors and/or records various vehicle dynamics operating parameters including at least one parameter indicating a yawing of the vehicle 10.

Figure 2:
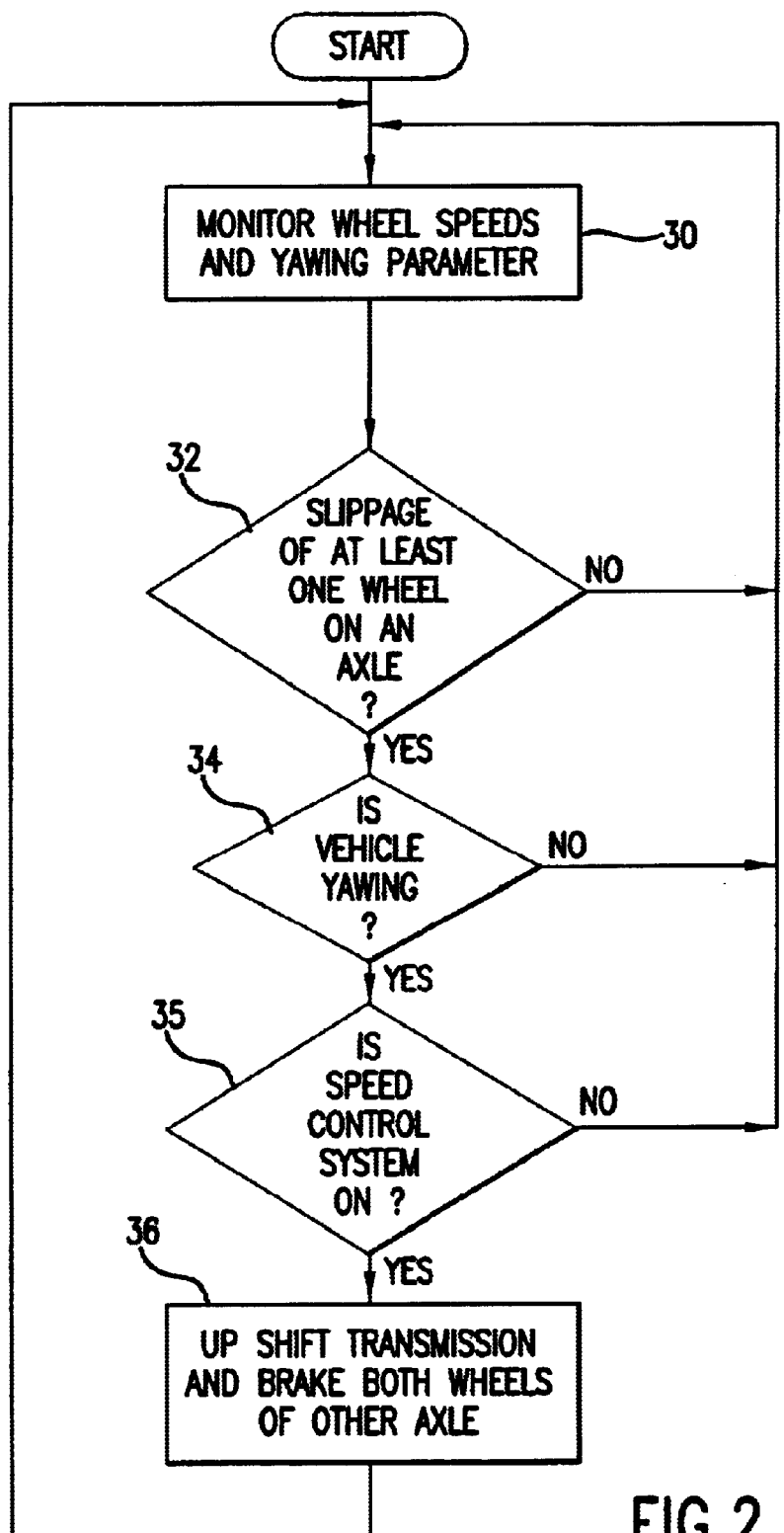
FIG. 2 is a flow chart illustrating the operation of the control system according to the present invention.

FIG. 2 is a flow chart illustrating the operation of the control system with the electronic control unit for wheel-specific braking torque control of the vehicle 10.

Referring to the flow chart FIG. 2, in accordance with the present invention, in the case of a control system with an electronic control unit for wheel-specific braking torque control in a vehicle with an electronically controllable transmission, the control unit 20 monitors and/or records the speeds of all wheels of the vehicle for the purpose of recognizing wheel slippage (step 30). Furthermore, the control unit monitors and/or records at least one vehicle dynamics operating parameter of the vehicle as an input signal, which can be recognized by the yawing of the vehicle (step 30). In the case of slippage on at least one wheel of an axle (step 32) and when yawing of the vehicle takes place (step 34), the control unit initiates an up-shifting process in the transmission in order to reduce the engine torque by a certain torque amount (step 36). At the same time, the control unit initiates a braking intervention on both wheels of the other axle, i.e. the axle where no wheel slippage exists, in order to increase the braking torque by the same torque amount (step 36).

The control unit initiates the up-shifting process and the braking intervention preferably only when a speed control system is activated (step 35).

The invention is particularly beneficial in an application with all-wheel drive off-road vehicles traveling on a descending slope having low friction coefficient ratios (e.g. on gravel) in low gear (e.g. with turned-on reduction gearbox, if available). The speed control system can involve a so-called descending slope control, which can be pre-selected manually by the driver and performs braking interventions on steep descending slopes in order to maintain a specified low speed (e.g. 8 km/h). Such a descending slope control has been known, for example under the term "HDC" (hill descent control) from European Patent document EP 0 784 551 A1. In off-road vehicles, descents in difficult terrain are generally driven in the smallest possible gear by utilizing the engine braking torque or engine towing torque and/or with turned-on speed control system (e.g. "HDC"). In the case of a steep descending mountain slope with loose ground and/or low friction coefficient ratios, the engine towing torque—due to the high gear ratio in the lowest possible gear (possibly also with a reduction transmission)—can cause the wheels on the rear axle to slip. This may lead to instability of the entire vehicle and can cause it to yaw around its vertical axis.

Unstable driving modes, particularly yawing (rotating around the vertical axis) can be recognized with added sensors, which are already installed in the vehicle, in the vehicle dynamics control systems in the vehicle, particularly with braking torque control and/or drive torque control. Such additional sensors monitor and/or record e.g. the steering angle, cross-acceleration and/or the yawing rate as vehicle dynamics operating parameters. Additionally, it should be pointed out that the invention is integrated preferably into the control unit of the already existing vehicle dynamics control systems.

When the control unit recognizes slippage, as in the described example on at least one wheel of the rear axle, and instability, particularly a yawing around the vertical axis, it sends an up-shift command to the transmission control unit of the electronically controlled gearbox so that the engine torque and/or in the present example the engine towing torque is reduced. At the same time, the torque amount, by which the engine towing torque is reduced due to the higher gear, is used as a braking torque increase through a braking intervention move on the wheels of the axle where no wheel slippage occurred, i.e. the wheels of the front axle. This braking torque compensation is performed so as to maintain the vehicle speed at the same value it had before the up-shifting process occurred. When the speed control system (here "HDC") was not turned on previously, it can be turned on automatically after the up-shifting command. The up-shifting command in accordance with the invention with simultaneous braking compensation, however, can only take place when the speed control system has already been turned on.

The above example assumed a forward descending drive. The invention, however, can also be applied in a reverse descending drive. In this case, instability will occur on the front axle and the braking intervention will be initiated on the wheels of the rear axle after the up-shifting command.

The invention is neither limited to vehicles with speed control systems or to all-wheel drive vehicles.

The invention provides a contribution to active driving safety because it increases the controllability of vehicles in difficult terrain in general and during driving in low gear on descending slopes in all-wheel drive off-road vehicles in particular.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for wheel-specific braking torque control, comprising:

an electronically controlled transmission;

an electric control unit operatively coupled with the electronically controlled transmission;

wherein said control unit monitors wheel speeds of the vehicle in order to recognize wheel slippage and monitors at least one vehicle dynamic operating parameter of the vehicle indicating a yawing of the vehicle; and further wherein when slippage is detected on at least one wheel of an axle and when the parameter indicates yawing of the vehicle is occurring, said control unit initiates an up-shifting process via the electronically controlled transmission to reduce engine torque by a certain torque amount, said control unit simultaneously initiating a braking intervention on both wheels of the other axle of the vehicle in order to increase braking torque by the same torque amount.

2. The control system according to claim 1, further comprising a speed control system, said control unit only initiating the up-shifting process and braking intervention when the speed control system is on.

3. A method of performing wheel-specific braking torque control in a vehicle equipped with an electronically controlled transmission and an electric control unit operatively coupled thereto, the method comprising the acts of:

monitoring wheel speeds of wheels of the vehicle;

monitoring at least one operating parameter of the vehicle that indicates a yawing of the vehicle;

if slippage is detected on at least one wheel of an axle of the vehicle when the monitored operating parameter indicates a yawing of the vehicle is occurring, initiating an up-shifting process in the electronically controlled transmission to reduce engine torque by a certain torque amount and simultaneously initiating a braking intervention on both wheels of another axle in the vehicle to increase the braking torque by the same torque amount.

4. The method according to claim 3, wherein the up-shifting process and simultaneous braking intervention takes place only when a speed control system in the vehicle is on.

* * * * *